May 31, 1966  B. J. NORMAN  3,253,469
METHOD AND APPARATUS FOR OBTAINING A PROPORTIONAL-TO-FLOW
COMPOSITE SAMPLE
Filed July 30, 1962  3 Sheets-Sheet 2
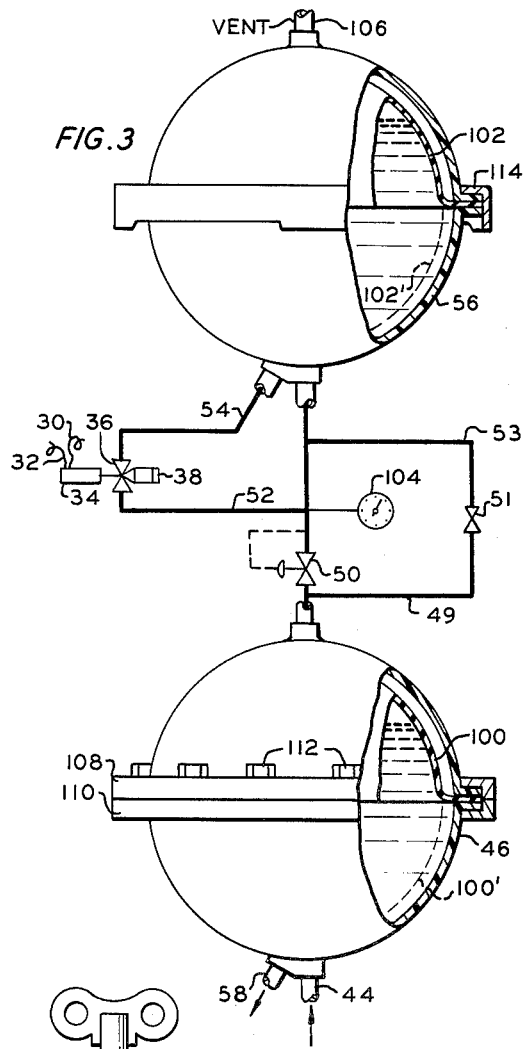
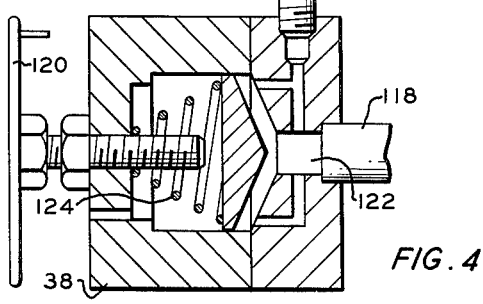
INVENTOR.
B. J. NORMAN
BY Young and Quigg
ATTORNEYS

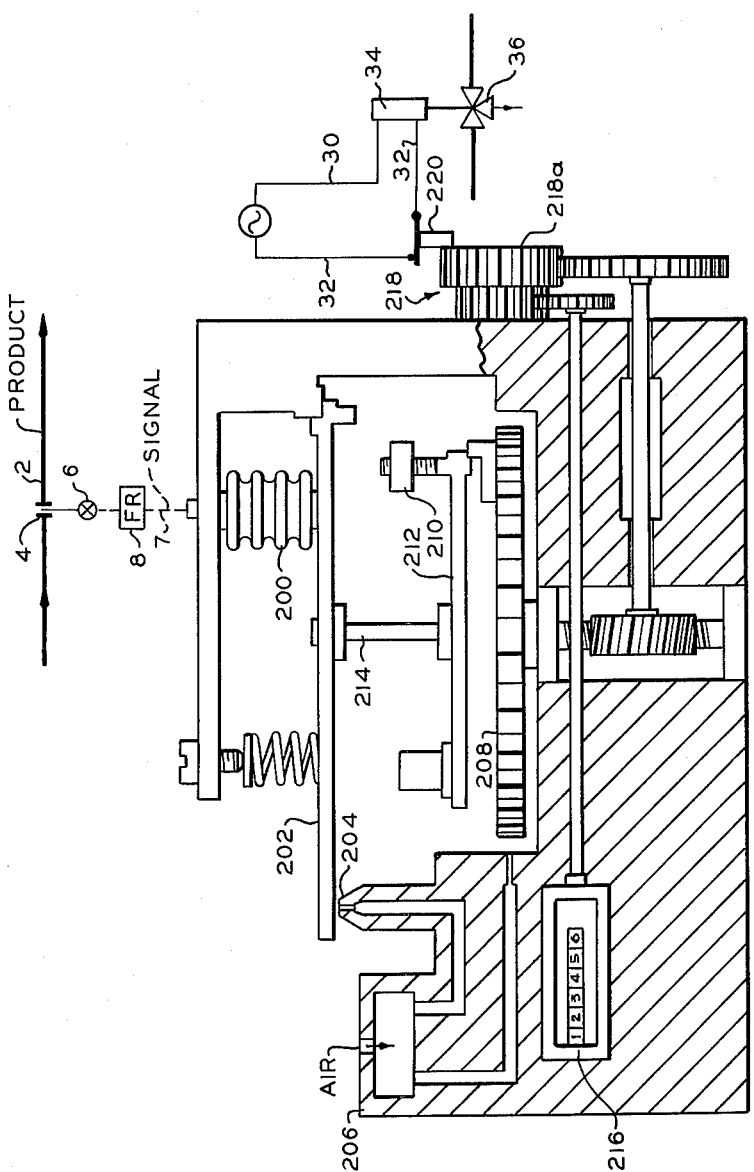

United States Patent Office 3,253,469
Patented May 31, 1966

3,253,469
METHOD AND APPARATUS FOR OBTAINING A PROPORTIONAL-TO-FLOW COMPOSITE SAMPLE
Billy J. Norman, Borger, Tex., assignor to Phillips Petroleum Company, a corporation of Delaware
Filed July 30, 1962, Ser. No. 213,421
5 Claims. (Cl. 73—422)

This application is a continuation-in-part of my copending application, Serial No. 157,364, filed December 6, 1961, and now abandoned.

This present invention relates to a method and apparatus for collecting fluid samples proportional to flow rate for the purpose of subsequently analyzing the collective samples.

The quality of fluid obtained in the commercial production of many fluids vary significantly during different periods of their manufacture although the production rate may be nearly constant. A sample of a fluid taken at one step or stage of its manufacture would, therefore, not be truly representative of the quality throughout the entire period of flow of such liquid from the source from which it is being manufactured. At one period of its manufacture it may be very rich; at another period it may be very lean. Many devices have been proposed for the collection of a composite sample which is truly representative of the quality throughout the entire period of production. However, the devices heretofore proposed are deficient in their failure to take into consideration the effect of flow rate on the sample. In other words, it is insufficient if a constant volume sample is taken at regular intervals when the product stream is flowing at irregular rates. It is, therefore, desirable that a method and device be proposed for the taking of a proportional-to-flow composite sample from a product stream having an irregular flow rate.

An object of the present invention is to provide a simple inexpensive method and means for the collection of a representative sample of fluid flowing through a line over a period of time.

Another object of the invention is to provide method and means for the collection of a fluid sample at the existing pressure in the line through which the fluid is flowing, said composite sample being proportional to the rate of flow of said fluid.

These and other objects and advantages of the present invention will appear from the following detailed description of the accompanying drawing, specification and claims.

These objects are broadly accomplished by a method and apparatus for the obtaining of a composite sample from a flowing stream of fluid by determining the flow rate of said flowing stream, discontinuously removing a portion of said stream at a frequency proportional to said flow rate and storing said portions for periodic analysis.

In one aspect, the invention comprises a transducer for the conversion of a pneumatic signal into a pulsating electrical signal comprising a turbine rotor, means for transmitting a continuous pneumatic signal to said rotor so as to rotate said rotor at a speed proportional to the pneumatic signal, means for converting the centrifugal force of the rotating rotor which is the square of the turbine speed into a force which will balance the pneumatic signal so that the rotor speed will be proportional to the square root of the pneumatic signal, said rotor discontinuously completing an electrical circuit with each revolution thereof thereby creating electrical impulses whose frequency is directly proportional to said pneumatic signal.

The invention can best be described by reference to the accompanying drawings:

FIGURE 3 is a cross sectional view of the sampler.

FIGURE 4 is a cross sectional view of the sample volume regulator.

FIGURE 5 is a simplified sketch of the turbine rotor device for converting a pneumatic signal into a pulsating electrical signal.

Although this invention is best described by reference to a particular process, the utilization of specific components for the determination of flow rates, the conversion of pneumatic signals into an electric signal, a specific programmer and a specific composite sampling device, it will be obvious to those skilled in the art that any or all of these components may be substituted by equivalent devices within the scope of the invention.

Figure 1:
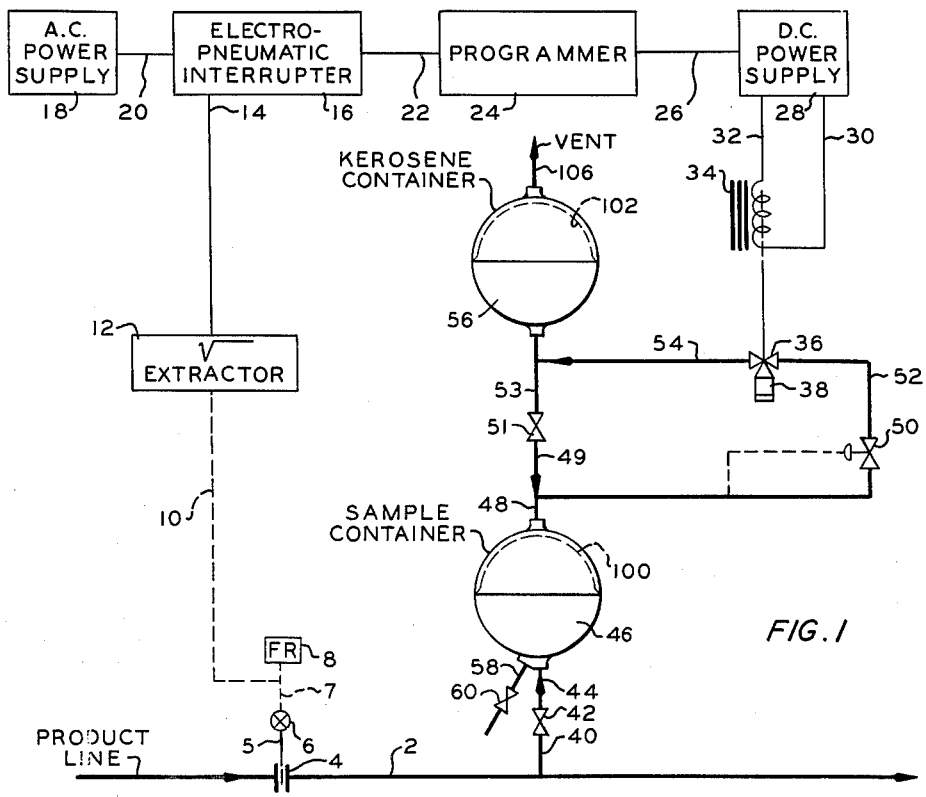
FIGURE 1 is a diagrammatic illustration of the various steps and the overall system for the obtaining of a composite sample.

Referring now to FIGURE 1, conduit 2 contains a flowing product stream which may or may not be flowing at a constant rate. Both the sample container 46 and the kerosene container 56 are diaphragm divided spheres. Kerosene fills the sample container 46 over diaphragm 100 and is displaced into the kerosene container under the diaphragm by passing through the pressure/regulator 50, three-way solenoid valve 36 and volume regulator 38 to the kerosene container 56. This is frequently accomplished by having a spring loaded volume regulator 38 full of kerosene forced into the kerosene container with each full cycle of the solenoid. An amount of sample then enters the sample container equal to the volume of kerosene removed. At this point, a proportion-to-flow sample is caught by actuating the solenoid at a frequency proportional to the product stream flow rate. This may be done by changing the pneumatic flow transmittal signal to an electrical signal and integrating it to run the programming cams 76, 80 (FIGURE 2) at a rate proportional to flow. The cams are notched to cause the solenoid to operate once each revolution. Thus, the sample is essentially caught in a constant volume at a frequency proportional to the flow of the stream.

Referring to FIGURE 1 an orifice or other flow measuring means 4 is suitably disposed in relation to conduit 2 for determining the flow rate therein, and transmits a signal through line 5 proportional to the square of the flow rate. Transmitter 6 transmits this signal through line 7 to flow recorder 8. From flow transmitter 6 a 3 to 15 p.s.i. air signal is transmitted to electro-pneumatic interrupter 16. However, since this signal is related to the square of the flow rate it is necessary that the square root be taken so that the flow to the interrupter 16 is proportional to the flow rate. A number of devices well known to those skilled in the art can be utilized for the square root extractor 12, including a square rooting cam. A suitable commercial controller is a model No. 208R electro-pneumatic interrupter, Taylor Instrument Co., Rochester, N.Y., described in Taylor Bulletin 1C101, July 1956.

The output air pressure of the pneumatic controller in interrupter 16 is converted into proportional electrical impulses by interrupter 16. Thus, the controller output air pressure determines the percentage of current "on" time of interrupter 16 so that the current "flows" through conductor 22 to programmer 24 for a period of time proportional to the rate of flow of the product stream.

Another interrupter controller instrument which is suitable for the conversion of the pneumatic signal to an electrical signal proportional to the flow is a Minneapolis-Honeywell Class 70 square root electrical pneumatic integrator, specification Number 70051L, Brown Instrument Co., Philadelphia, Pa. Just as in the previously described interrupter controller, the amount of time the power is "on" for the hereinafter described cam-drive motor is a function of the square root of the stream flow transmitter signal.

Alternating current is supplied to the electro-pneumatic controller interrupter 16 by an alternating current (A.C.) power supply 18 through electrical conductor 20. The impulses from the controller interrupter 16 pass through a programmer 24, which has only one principal function, to actuate solenoid 34 and therefore solenoid valve 36 at a frequency proportional to the period of time the current is "on" from the controller interrupter. A number of devices are suitable for this programmer and one suitable apparatus is described in FIGURE 2, hereinafter discussed. The programming device emits a signal through electrical conductor 26, actuates D.C. power supply 28 and by conductors 30 and 32 actuates a solenoid 34. When current flows through conductors 30 and 32 and solenoid 34, three-way valve 36 is turned and a predetermined volume of kerosene will flow from sample container 46 through conduit 48, pressure regulator 50, conduit 52, three-way valve 36, volume regulator 38 and conduit 54 to the kerosene container 56. When the programmer 24 cuts the current in conduit 30 and 32 so as to de-energize solenoid 34 the three-way valve 36 will be turned slightly by some force, such as a spring action, so that when solenoid 34 is again energized valve 36 will again be turned to permit the flow of kerosene. The removal of kerosene from the upper half of sample container 46 permits the flow of a small constant volume product from conduit 2 through conduit 40, valve 42, and conduit 44 into the lower half of the sample container. Both the lower sample container and the upper nonsample container are separated by diaphragms 100 and 102 respectively to prevent the mixing of the sample and the kerosene. Diaphragm 102 prevents vaporization of the kerosene. A sampling removal conduit is provided by conduit 58 and valve 60.

The sampling device may be any composite sampler which will permit the obtaining and collecting of a very small constant volume sample. A suitable device is produced by McFarland Engineering and Pump Co., 1206 Nance, Houston, Texas, as described in their 1959 catalog, pages 33–46.

Figure 2:
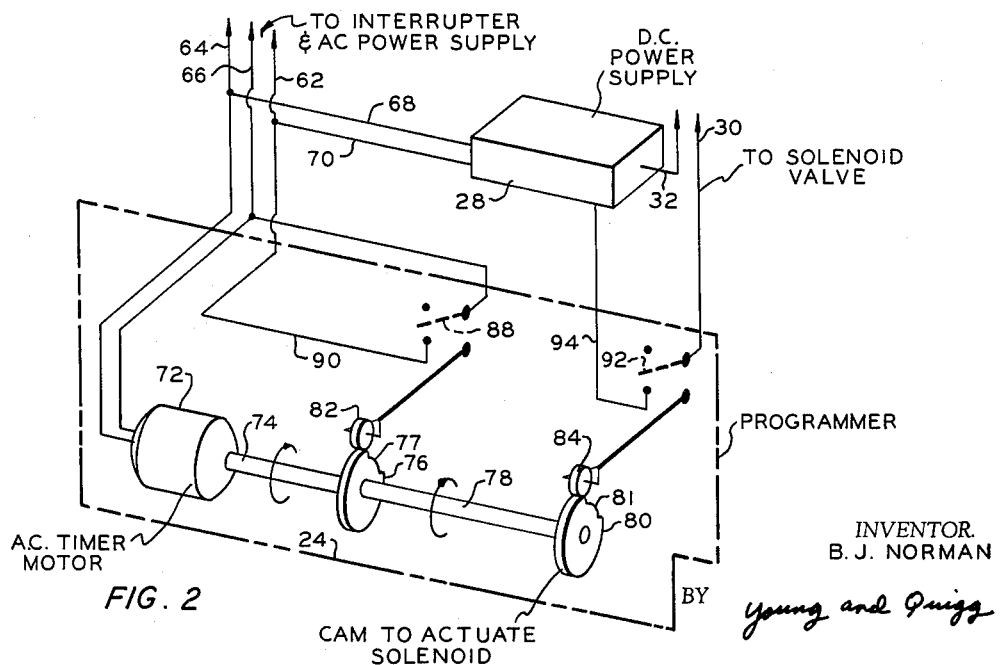
FIGURE 2 illustrates in detail the operation of the programmer and D.C. power supply to actuate the solenoid valve.

FIGURE 2 illustrates one suitable type of programmer for energizing the solenoid at a frequency proportional to the period of time during which current is flowing from the electric pneumatic controller interrupter. Lines 62 and 64 are connected to the A.C. power supply with line 66 connected to the interrupter terminal discharge in such a way that when current is intermittently passing through the interrupter lines 64 and 66 are "hot." When a current is passing through 64 and 66, A.C. timer motor 72 is actuated causing shaft 74 to revolve. A.C. timer motor 72 is a constant speed motor, such as a clock motor. Depending upon the length of time the current is "on," said motor may turn on and off several times per revolution or may revolve several revolutions per cycle. It is obvious that the motor will operate for a period of time proportional to the fluid flow rate through conduit 2. The revolution of shaft 74 causes the revolution of cams 76 and 80 interconnected by shaft 78. As cam 80 revolves follower 84 will fall due to the depression 81 in cam 80 and close a contact between lines 92 and 94. This will complete the circuit so that the current flow through lines 30 and 32 will pass through solenoid 34 as hereinbefore described. Cam 76 thus permits the operation of the motor during the sampling cycle while cam 80 controls the actuation of the solenoid at a frequency proportional to the product flow rate.

FIGURE 3 is a cross sectional view of a suitable composite sampling device which can be utilized in the method and apparatus of this invention. As hereinbefore described when current passes through lines 30 and 32 at a frequency proportional to the flow rate of the product stream the solenoid 34 is actuated to permit the entry of a constant volume of kerosene to pass through conduit 52, three-way valve 36, volume regulator 38, and conduit 54 into the upper storage sphere.

Referring briefly to FIGURE 4 for details of the sample volume regulator, it is seen that the displaced liquid kerosene enters the chamber 122 from conduit 118 when the three-way solenoid valve 36 is open to the lower container 46 and is discharged by spring pressure provided by spring 124 which is adjusted by volume adjustment screw 120 into the upper container when the valve is in the opposite position. Air bleeder valve 126 permits the bleeding of air.

The removal of a volume of kerosene from the upper section of the lower sphere permits the sample to enter from conduit 44 into the lower half of the lower sphere thereby distending the diaphragm to the upper position as shown in FIGURE 3. Reference numerals 100′ and 102′ represent the diaphragm in the positions occupied when the sampler is devoid of sample. The kerosene which is always above the diaphragm 100 passes from the upper half of the lower sphere 46 through the pressure regulator 50, said pressure being indicated by pressure gauge 104, into the upper sphere as hereinbefore described. Vent 106 is provided to permit the escape of air from the upper sphere. It is also to be noted that it is particularly advantageous to make the upper half of the upper sphere of a transparent material so that the sampler can be periodically viewed to see if it needs to be emptied. The composite sample may be removed very simply by opening valves 51 and 60 and applying air pressure to conduit 106 thereby forcing kerosene from sphere 56 through conduits 53, 49 and valve 51 so as to permit the removal of a sample from the lower sphere 46 into a laboratory bomb or the like (not shown). Any suitable means be provided for positioning the diaphragm, such as flanges 108 and 110 or flange 114 held on by any suitable fastening means.

Another simplified device for transmitting an electrical signal to the solenoid valve proportional to flow is shown in FIGURE 5. A 3–15 p.s.i. signal,, proportional to 0–100% of the differential pressure from a flow transmitter 6, is applied to the integrator receiver bellows 200. The force exerted by the bellows positions a force bar 202 in relation to a nozzle 204. With an increase in differential pressure the force bar approaches the nozzle and the resulting back pressure, amplified by an air relay 206, drives a turbine rotor 208. As the rotor revolves, the weight 210, which is mounted on a flexure-pivoted bell crank 212 on top of the rotor, develops a centrifugal force. This force feeds back through the thrust pin 214 to balance the force exerted on the force bar by the bellows. The turbine motor may be geared directly to the counter 216 through the charge gears 218. Changes in flow continually produce changes in turbine speed to maintain a continuous balance of forces. The centrifugal force is proportional to the square of the turbine speed. This force balances the signal pressure which is proportional to the square of the flow, therefore turbine speed is directly proportional to flow. A raised cam 220 on gear 218A then periodically completes the circuit in line 32 so that current flows to the solenoid 34 to cause a sample to be taken. Thus a sample is taken periodically proportional to the speed of the rotor which in turn is rotating at a speed proportional to the flow rate of product in line 2. Any suitable device may be used to complete the electrical circuit as the rotor turns. Preferably, since the rotor rotates at a relatively high speed, the speed will be reduced by suitable mechanism so that a fewer total number of samples will be taken.

A suitable device commercially available to operate on the above principle is type 14A Pneumatic Integrator, manufactured by the Foxboro Company and illustrated in Foxboro Bulletin 13–23, pp. 4–5.

It is also obvious that a constant speed motor could be used to program the solenoid so that it could operate at a constant frequency. The main utility for this type of unit would be on streams of constant flow where the expense of the more expensive programmer is not justifiable.

It is also not difficult to imagine a refinement that needs no electricity so that it would be employable in more remote areas. In these situations gases are normally substituted for air. This whole system could be operated by air-driven, constant speed motors.

The herein described method and apparatus has many advantages as a proportional to flow composite sampler. It is very simple, has few moving parts, no critical orifices, and is versatile so as to permit the collection of any size or kind of sample. All parts are unmodified commercially available units.

The method and apparatus will now be described with relation to a specific embodiment.

Example I

A product stream containing cyclohexane (98+% pure with a trace of n-hexane) was chosen to install the sampler and programming devices shown in the drawing as a means of checking the accuracy of the sampler from the componential point of view since the stream varied in volume by 100 percent frequently within a 24-hour period. This forced the sampler to operate over a wide range. The sampler had a capacity of 5 gallons and took a 1 cc. sample each time the valve opened. Table I is a tabulation of the volumes of 10 samples which were drawn periodically at intervals of 2 to 20 days apart for a total of 80 days during which time the line volume varied from 21,458 to 175,415 gallons per sample period. A plot of the sample volume versus the line volume provides a reasonable linear relationship proving that the sampler was collecting a sample proportional to the flow.

TABLE I

| Sample No. | Sample Volume, cc's. | Line Volume, gallons |
|---|---|---|
| 1 | 790 | 175,415 |
| 2 | 558 | 121,995 |
| 3 | 628 | 147,338 |
| 4 | 490 | 108,235 |
| 5 | 150 | 21,458 |
| 6 | 585 | 99,366 |
| 7 | 280 | 60,914 |
| 8 | 280 | 72,127 |
| 9 | 525 | 103,773 |
| 10 | 390 | 96,373 |

While certain examples, structures, composition and process steps have been described for purposes of illustration, the invention is not limited to these. Variation and modification from the scope of the disclosure and the claims can readily be effected by those skilled in the art.

What I claim is:

1. A composite sampling system comprising a conduit for carrying a product stream fluid, a sampling device comprising a first chamber having first and second sub-chambers, said first sub-chamber of said first chamber being in communication with said product stream conduit, and a second chamber having a first sub-chamber and a second vented sub-chamber, said first sub-chamber of said second chamber being in communication with said second sub-chamber of said first chamber, said chambers having movable means for separating each of said chambers into said sub-chambers, fluid withdrawal means connected to said first sub-chamber of said first chamber, a valve means regulating the passage of a constant volume of a displacement fluid other than said product stream fluid from the second sub-chamber of said first chamber to the first sub-chamber of said second chamber thereby permitting the flow of a substantially equal volume of product stream fluid from said conduit into the first sub-chamber of said first chamber, said valve means being periodically actuated to permit the passage of a constant volume of said displacement fluid during each period of actuation, a flow measuring means disposed in said product stream conduit for determining the rate of flow of fluid through said conduit and forming a signal proportional to said flow rate, means operatively connected to said flow measuring means and said valve means and adapted to actuate said valve means in response to said signal from said flow measuring means after a predetermined amount of product stream fluid has passed through said product stream conduit past said flow measuring means.

2. A composite sampling system comprising a conduit for carrying a product stream fluid, a sampling device comprising a first chamber having first and second sub-chambers, said first sub-chamber being in communication with said product conduit and a second chamber having a first sub-chamber and a second vented sub-chamber, said first sub-chamber being in communication with said second sub-chamber of said first chamber, said chambers having movable means for separating each of said chambers into said sub-chambers, fluid withdrawal means connected to said first sub-chamber of said first chamber, a valve means regulating the passage of a constant volume of a displacement fluid other than said product stream fluid from the second sub-chamber of said first chamber to the first sub-chamber of said second chamber thereby permitting the flow of a substantially equal volume of product stream fluid from said conduit into the first sub-chamber of said first chamber, said valve means being periodically actuated to permit the passage of a constant volume of said displacement fluid during each period of actuation, a flow measuring means disposed in said product stream conduit for determining the rate of flow of fluid through said conduit and forming a pneumatic signal which is a pressure proportional to said flow rate, means for translating said pneumatic signal into electrical impulses which are discontinuously generated for periods of time proportional to said pneumatic signal and therefore to said flow rate, a constant speed timer motor discontinuously driven by said electrical impulses and a programming means interconnected with said motor and said valve means to actuate said valve means after said discontinuously generated electrical impulses have flowed to said programming means for a cumulative period of time sufficient to operate said programming means for an amount of time proportional to a specific volume of fluid product stream passing said flow measuring means.

3. A composite sampling system comprising a conduit for carrying a product stream fluid, a sampling device comprising a separate lower first chamber having first and second sub-chambers, said first sub-chamber being in communication with said product conduit and a separate upper second chamber having a first sub-chamber and a second vented sub-chamber, said first sub-chamber being in communication with said second sub-chamber of said first chamber, said chambers having movable means for separating each of said chambers into said sub-chambers, fluid withdrawal means connected to said first sub-chamber of said first chamber, a valve means regulating the passage of a constant volume of a displacement fluid other than said product stream fluid from the second sub-chamber of said first chamber to the first sub-chamber of said second chamber thereby permitting the flow of a substantially equal volume of product stream fluid from said conduit into the first sub-chamber of said first chamber, said valve means being periodically actuated to permit the passage of a constant volume of said displacement fluid during each period of actuation, a flow measuring means disposed in said product stream conduit for determining the rate of flow of fluid through said conduit and forming a pneumatic signal which is of a pressure proportional to said flow rate, a pneumatic transmitting means associated with said flow measuring means for transmitting said first pneumatic signal to a means for extracting the square root of said signal and thereby forming a second pneumatic signal of a pressure proportional to the square root of said first pneumatic signal and therefore proportional to said flow rate, means for translating said second pneumatic signal into electrical impulses which are discontinuously generated for periods of time proportional to said flow rate, a constant speed timer motor driven by said electrical impulses and a programming cam means interconnected with said motor and said valve means to actuate said valve means after said discontinuously generated electrical impulses have flowed to said programming cam means for a cumulative period of time sufficient to rotate said cam means an amount proportional to a specific volume of fluid product stream passing said measuring means.

4. A composite sampling system comprising a conduit for carrying a product stream fluid, a sampling device comprising a separate lower chamber divided into first and second separate portions by a diaphragm, the first portion being in communication with said product conduit, and a separate upper chamber divided into first and second separate portions by a diaphragm, the first portion being in communication with the second portion of said lower chamber, a valve means regulating the passage of a constant volume of a displacement fluid other than the product stream fluid from said second portion of said lower chamber to said first portion of said upper chamber thereby permitting the flow of a substantially equal volume of product stream fluid from said conduit into the first portion of said lower chamber, the diaphragm in said lower chamber being adapted to resiliently yield when product stream fluid enters said lower chamber thereby moving displacement fluid from the second portion of said lower chamber into the first portion of said upper chamber, the diaphragm in said upper chamber being adapted to resiliently yield to the displacement fluid that is moving out of the second portion of said lower chamber into the first portion of said upper chamber, vent means in communication with the second portion of said upper chamber, sample withdrawal means in communication with the first portion of said lower chamber and adapted to allow sample removal therethrough from said first portion out of said lower chamber thereby allowing the diaphragm in said lower chamber to return to its normal non-yielded configuration, said valve means being periodically actuated to permit the passage of said constant volume of said displacement fluid into said first portion of said upper chamber during each period of actuation, a flow measuring means disposed in said product stream conduit for determining the rate of flow of fluid through said conduit and forming a pneumatic signal proportional to the square of the flow rate, means for converting said pneumatic signal into a pulsating electrical signal comprising a turbine rotor, means for transmitting a continuously pneumatic signal to said rotor so as to rotate same at a speed proportional to said pneumatic signal, means for converting the centrifugal force of the rotating rotor which is the square of the rotor speed into a force which will balance the pneumatic signal so that the rotor speed will be proportional to the square root of the pneumatic signal, said rotor discontinuously completing an electrical circuit with each revolution thereof so as to discontinuously actuate said valve means at a frequency proportional to the rotation of speed of said rotor and therefore said flow rate, said sample thus removed being representative of a specific volume of said product stream fluid notwithstanding the irregular rates of flow of same.

5. A composite sampling system comprising a conduit for carrying a product stream fluid, a sampling device comprising a separate lower chamber divided into lower first and upper second separate portions by a diaphragm, the first portion being in communication with said product conduit, and a separate upper chamber divided into lower first and upper second separate portions by a diaphragm, the first portion being in communication with the second portion of said lower chamber, a valve means regulating the passage of a constant volume of a displacement fluid other than the product stream fluid from said second portion of said lower chamber to said first portion of said upper chamber thereby permitting the flow of a substantially equal volume of product stream fluid from said conduit into the first portion of said lower chamber, the diaphragm in said lower chamber being adapted to resiliently yield when product stream fluid enters said lower chamber thereby moving displacement fluid from the second portion of said lower chamber into the first portion of said upper chamber, vent means in communication with the second portion of said upper chamber, sample withdrawal means in communication with the first portion of said lower portion and adapted to allow sample removal therethrough from said first portion out of said lower chamber thereby allowing the diaphragm in said lower chamber to return to its normal non-yielded configuration, said valve means being periodically actuated to permit the passage of said constant volume of said displacement fluid into said first portion of said upper chamber during each period of actuation, a flow measuring means disposed in said product stream conduit for determining the rate of flow of fluid within the interior of said product conduit, means for transmitting electrical impulses at frequencies proportional to said flow rate comprising a turbine rotor rotated by a pneumatic signal proportional to the flow rate and formed in response to the sensing of said flow measuring means of said flow rate, and means for converting the centrifugal force of the rotating turbine rotor which is the square of the turbine speed into a force which will balance said pneumatic signal so that the turbine rotor speed is proportional to the flow rate, said rotor discontinuously completing an electrical circuit with each revolution so as to discontinuously actuate said valve means at a frequency proportional to the speed of revolution of said rotor and therefore said flow rate.

References Cited by the Examiner

UNITED STATES PATENTS

| 2,262,561 | 11/1941 | Schwendner | 290—40 |
| 2,418,876 | 4/1947 | Grace | 73—422 |
| 2,592,464 | 4/1952 | Plank | 73—422 |
| 2,697,939 | 12/1954 | Martin et al. | 73—113 |
| 2,925,735 | 2/1960 | Tapp et al. | 73—422 |
| 2,930,231 | 3/1960 | Bowditch | 73—206 |
| 3,053,990 | 9/1962 | Von Berg et al. | 290—40 |

RICHARD C. QUEISSER, *Primary Examiner.*

EDWARD D. GILHOOLY, J. FISHER,
*Assistant Examiners.*